United States Patent
Grosseau

[11] 3,888,549
[45] June 10, 1975

[54] DEVICES FOR CONTROLLING THE BRAKING OF VEHICLE WHEELS

[75] Inventor: Albert Grosseau, Chaville, France

[73] Assignee: S.A. Automobiles Citroen, Paris, France

[22] Filed: Jan. 31, 1973

[21] Appl. No.: 328,304

[30] Foreign Application Priority Data
Feb. 8, 1972 France .................. 72.04583

[52] U.S. Cl. ............................ 303/21 EB; 303/20
[51] Int. Cl. ............................................ B60t 8/08
[58] Field of Search ........... 188/181 C; 303/20, 21; 317/5; 324/161; 340/53, 263, 62; 108/105 E; 307/10 R

[56] References Cited
UNITED STATES PATENTS

| 3,503,653 | 3/1970 | Davis et al. | 303/21 CF |
| 3,528,708 | 9/1970 | Ballard | 303/21 EB |
| 3,535,004 | 10/1970 | Howard et al. | 303/20 X |
| 3,583,773 | 6/1971 | Steinbrenner et al. | 303/21 EB |
| 3,604,760 | 9/1971 | Atkins | 303/21 CG |
| 3,656,816 | 4/1972 | Schlitz et al. | 303/21 F X |
| 3,701,568 | 10/1972 | Lewis et al. | 303/21 P |
| 3,768,872 | 10/1973 | Urban et al. | 303/21 BE |
| 3,794,389 | 2/1974 | Davis et al. | 303/21 P |

*Primary Examiner*—Trygve M. Blix
*Assistant Examiner*—Stephen G. Kunin
*Attorney, Agent, or Firm*—Eyre, Mann & Lucas

[57] ABSTRACT

A device for controlling the braking of at least one wheel of a vehicle travelling along the ground comprises apparatus for comparing the speed of the said one wheel with the speed of the fastest wheel of the vehicle. When the ratio of these speeds falls below a predetermined value the pressure in the braking circuit is reduced whereby to reduce the braking effect. The predetermined value is reduced as the speed of the vehicle is reduced to prevent reduction in the braking effect, for example when the vehicle is travelling around a relatively tight curve at a relatively low speed without any wheel slip.

20 Claims, 6 Drawing Figures

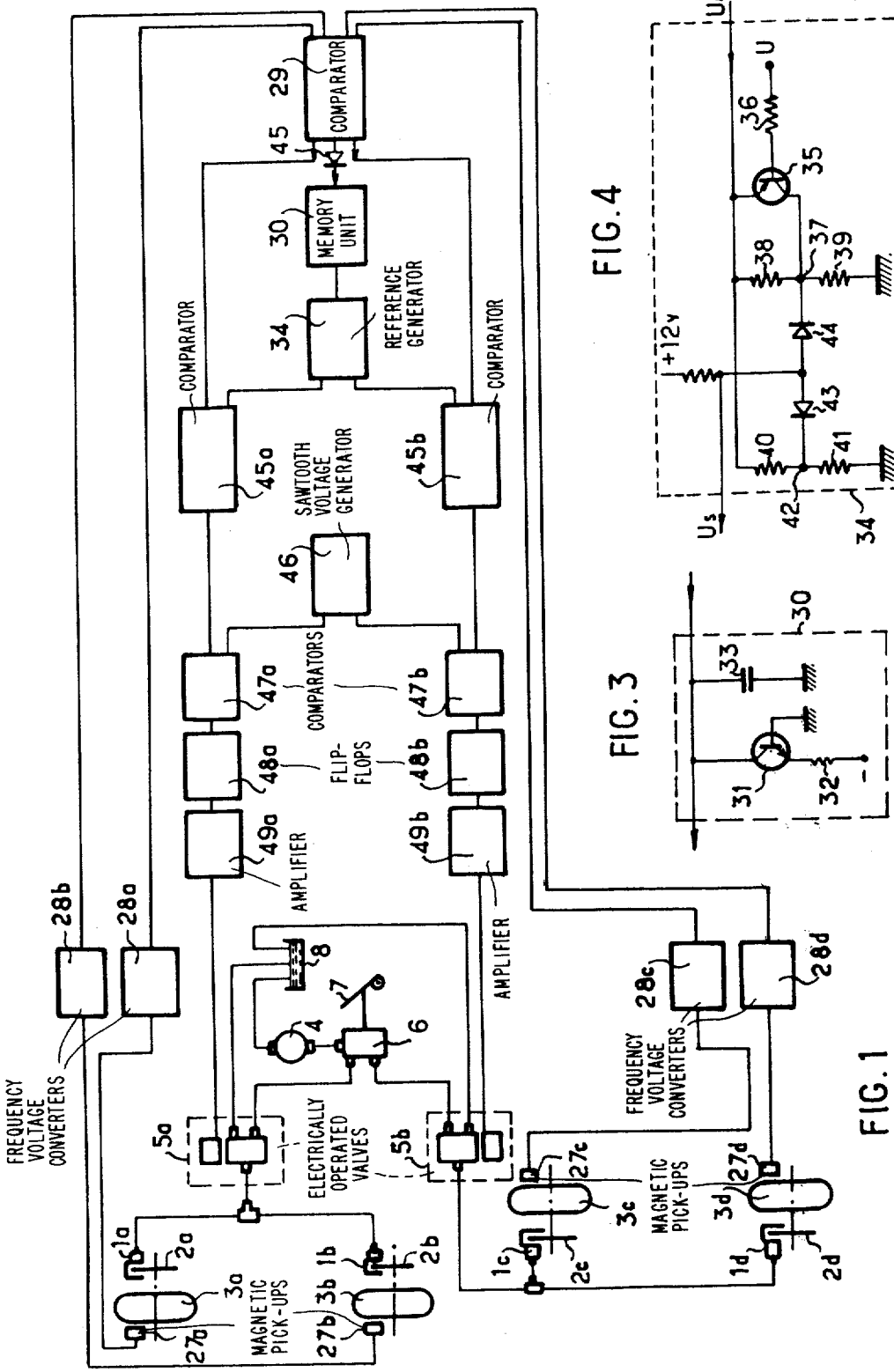

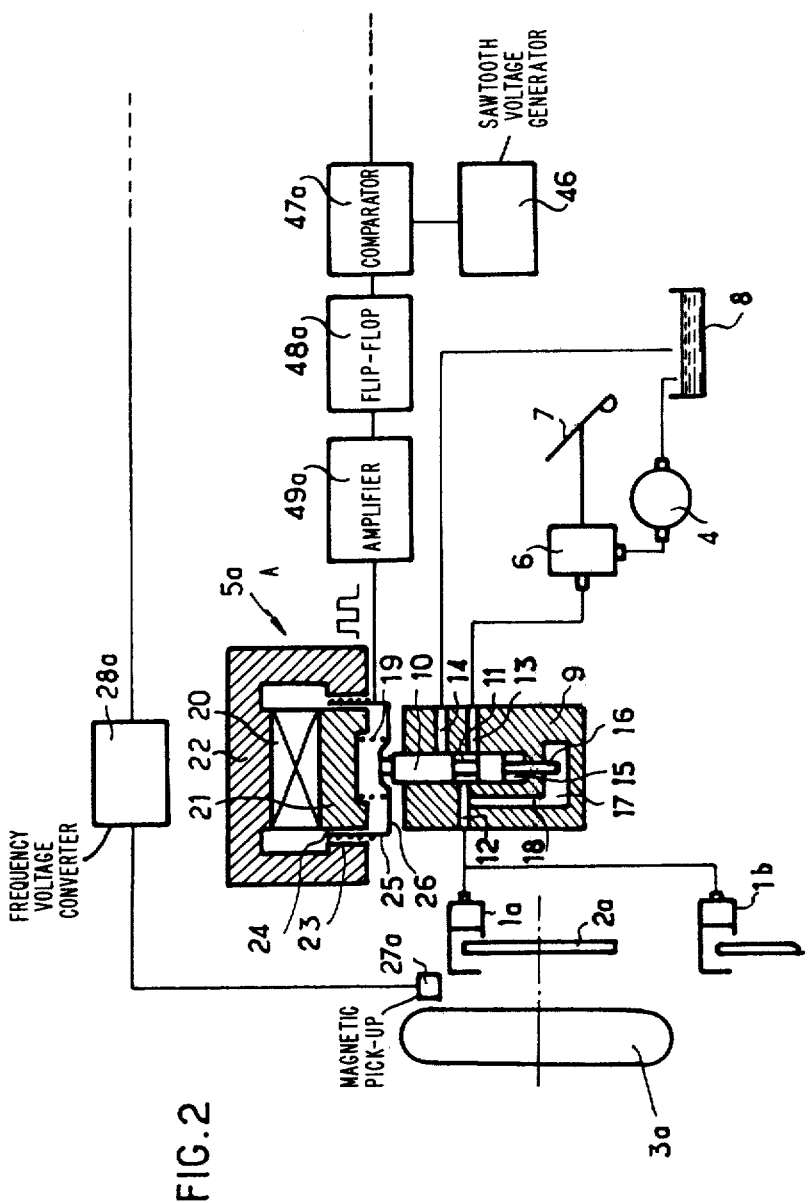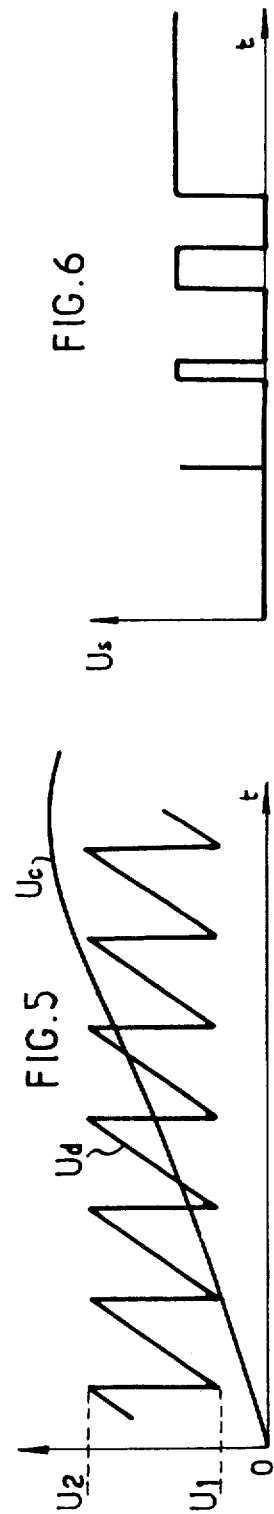

DEVICES FOR CONTROLLING THE BRAKING OF VEHICLE WHEELS

BACKGROUND OF THE INVENTION

1. Field of the Invention

The present invention relates to devices for controlling the braking of at least one wheel of a vehicle which is travelling over the ground, for example the wheel of an aircraft or of a motor vehicle.

2. Description of the Prior Art

There has been proposed anti-locking devices which comprise means for processing an electrical signal as a function of the slip of a wheel, and means for effecting a drop in pressure of the fluid feeding the braking elements when the slip reaches a predetermined value.

In such devices, the slip is determined by comparing the speed of the wheel with the speed of that wheel of the vehicle which is rotating the fastest, this latter speed representing, to a high degree of approximation, the true speed of the vehicle; indeed, even if all the wheels are braked, it is virtually impossible for all the wheels to lock at the same time. The drop in pressure is effected when the ratio of the speed of the wheel in question and the fastest wheel falls below a predetermined limit, the optimum value of which is of the order of 0.8.

However, these previously proposed devices are liable to obviate braking when the vehicle is moving around a curved path. When a vehicle of average track $a$ is taking a curve of radius R, there is a difference in speed between the wheel located on the inside of the curve and that which is on the outside. The ratio (K) of the speed of these two wheels is:

$$K = \frac{2a - R}{2a + R} \quad (1)$$

When the wheels are being turned on full lock, the ratio K has, in the majority of vehicles, a value close to 0.74.

When the speed of the vehicle increases, it becomes impossible to maintain full lock by virtue of the lack of adhesion due to centrifugal force. Considering the case of a dry road, for which the coefficient of friction is about 1, the radius of full lock necessary for there to be loss of adhesion is given by the formula:

$$R = \frac{MV^2}{Mg}$$

from which it is possible to reduce the value of K:

$$K = \frac{V^2/g - a/2}{V^2/g + a/2} \quad (2)$$

This ratio tends towards 1 when the speed increases and diminishes when the speed reduces; if, for example, the track $a$ is 1.5 m, then for a given vehicle, the ratio is 0.8 for a speed of approximately 29 k.p.h. and 0.74 for a speed of 25 k.p.h.

Thus, it is evident that, when the speed of the vehicle is less than 29 k.p.h., and, if the lock on the wheels is considerable, the ratio K can be less than 0.8. The previously proposed anti-locking devices described above would then effect a reduction in the braking action even although no wheel lock had occured.

SUMMARY OF THE INVENTION

According to the present invention, there is provided a device for controlling the braking of at least one wheel of a vehicle, said vehicle having a fluid-operated braking system, said device comprising means operative to compare the speed of the said one wheel with the speed of that wheel of the vehicle which is travelling at the fastest speed, means operative to generate from the ratio of these speeds an electrical signal representing the amount of slip of the said one wheel, means operative to reduce the pressure of fluid in the braking system when the said ratio falls below a predetermined value, and, means controlled by the speed of the fastest wheel to vary the said value whereby the valve is lowered as the speed of the fastest wheel is reduced.

Preferably the means for reducing the pressure in the braking system comprises an electrically operated valve having a valve member which is moved in dependence upon a control signal whereby the valve delivers a pressure substantially proportional to the control signal; in this manner slip can be maintained at its optimum value, as a function of the speed of the vehicle, whatever the amount of grip. Preferably a pulsed current, which is a function of the slip, is fed to the valve. The pulsed current can be formed of fixed frequency pulses, the pulses being of variable width according to the slip, or the pulses can be of fixed width and of variable frequency, the frequency varying as a function of the slip.

As a safeguard for the unlikely case where all the wheels lock simultaneously, the device can comprise a memory unit for storing the speed of the fastest wheel and for delivering a signal, the value of which decreases at a speed representing maximum deceleration which may be obtained under optimum conditions of adhesion.

BRIEF DESCRIPTION OF THE DRAWINGS

An embodiment of the invention will now be described, by way of example only, with reference to the accompanying diagrammatic drawings, in which:

FIG. 1 is a circuit diagram of a brake control device in accordance with the invention;

FIG. 2 is a section through an electrically-operated valve of the device;

FIGS. 3 and 4 are circuit diagrams of two components of the device;

FIG. 5 is a graph showing a control voltage and a sawtooth voltage;

FIG. 6 shows the pulses obtained when the control voltage varies as illustrated in FIG. 5.

DESCRIPTION OF THE PREFERRED EMBODIMENT

As shown in FIG. 1, front brake cylinders $1a$ and $1b$ cooperate in conventional manner with discs $2a$ and $2b$ which are respectively fastened for rotation with front wheels $3a$ and $3b$. The cylinders $1a$ and $1b$ can be caused to communicate with a source 4 of pressurised fluid through an electrically-operated valve $5a$ and a dispensing valve 6 which is controlled by a brake pedal 7. A fluid reservoir 8 is connected to the inlet of the source 4.

Similarly, rear brake cylinders $1c$ and $1d$ cooperate with brake discs $2c$ and $2d$ which are respectively fastened for rotation with rear wheels $3c$ and $3d$ and can be caused to communicate with the source 4 through the dispensing valve 6 and an electrically-operated valve 5b. The dispensing valve 6 is for example of the independent front-rear dual-circuit type.

Each of the valves 5a and 5b comprises a distributor consisting of a body 9 in a bore of which there is slidingly mounted a slide 10 (FIG. 2). The slide 10 has an annular groove 11 by which a port 12 connected to the cylinders 1a and 1b can be brought into communication either with a port 13 connected to the dispensing valve 6 or with a port 14 connected to the reservoir 8. When the slide 10 is displaced upwards from the position shown in FIG. 2, the port 12 is brought progressively into communication with the port 14 while the communication between the port 12 and the port 13 is progressively reduced whereby the pressure in the brake cylinders 1a and 1b is reduced.

The lower end portion of the bore in the body 9 constitutes a chamber 15 into the bottom of which extends an end portion of a needle 16 which is in contact with the slide 10. The other end portion of the needle 16 is located in a chamber 17 connected to the port 12 by a passage 18.

A spring 19 exerts a force F on the end of the slide 10 remote from the chamber 15. Thus, the slide 10 is subject to two opposing forces, namely the force F and the force exerted on the needle 16 by the pressure ($P_u$) existing in the chamber 17, and thus in the brake cylinders 1a, 1b.

Each valve 5a, 5b also comprises an electro-dynamic motor including a permanent magnet 20 fixed between a pole piece 21 and a pot-shaped magnetic yoke which, with the pole piece 21, defines an annular gap 23. The spring 19 bears against the pole piece 21.

A winding 24 carried by a coil 25 is disposed in the gap 23. The coil 25 is fitted onto a cup 26, the bottom of which is applied against the slide 10 by the spring 19.

The spring 19 is so rated that, if there is no current in the winding 24, the slide 10 is maintained in the position illustrated in FIG. 2 in which the bottom edge of the groove 11 is at the level of the port 13, the slightest displacement upwards of the slide bringing about a reduction in the open cross-section of the port 13. The spring 19 exerts on the slide 10 in the position a force F, the value of which is P.s, s being the cross-sectional area of the needle 15 and P being the pressure of the fluid in the port 13.

When current is flowing in the winding 24 in the appropriate direction, the winding 24 tends to be displaced axially upwardly, exerting on the cup 26 a force $f$ which is proportional to the mean strength $I_m$ of the current which is passing through the winding. The slide 10 follows the displacement of the winding as a result of the force exerted on the slide by the pressure prevailing in chamber 17. The pressure in the braking circuit assumes a value $P_u = P - \Delta P$ given by the formula:

$F - f = (P - \Delta P)s$, which shows that the fall in pressure $\Delta P$ of the fluid in the braking circuit is proportional to $f$, that is to say to the mean strength $I_m$ of the current passing through the winding 24.

A magnetic pick-up 27a to 27d in the proximity of each of the wheels 3a to 3d supplies a pulse, the frequency of which depends upon the speed of the adjacent wheel. Each of the pick-ups 27a to 27d, is connected to a frequency-voltage converter 28 to 28d which supply a current, the voltage of which is a function of the frequency of the input pulses, and hence of the speed of the corresponding wheel.

The converters 28a to 28d are connected to a comparator 29 which determines which wheel is rotating at the highest speed. Through a uni-directional conductor element 45, the signal is applied to a memory unit 30 which therefore stores data which is representative of the actual speed of the vehicle even if all four wheels are locked. As shown in FIG. 3, the memory unit 30 preferably comprises a transistor 31, the emitter of which is connected by a resistance 32 to the negative pole of a direct voltage source, the positive pole of which is connected to earth, and the base of which is connected to this positive pole. The signal from the comparator 29 is applied to the collector of the transistor and a resistor 32 links this collector with earth. Under normal conditions, the voltage at the terminals of the capacitor 33 is equal to that of the signal originating from the comparator 29. If this signal disappears, due to locking of the four wheels, the capacitor becomes discharged so that there remains at the output from the memory unit a voltage the value of which diminishes linearly as a function of the time. The components of the unit are so selected that the speed at which the voltage decreases represents the maximum deceleration which can be obtained under conditions of optimum grip.

The output of this memory unit 30 is applied to a generator 34 which multiplies the signal by a value k of between 0.7 and 0.8 and supplying a reference speed. As can be seen more particularly in FIG. 4, the generator 34 comprises a P-N-P transistor 35, the emitter of which is connected to the memory unit 30, and the base of which is connected to a voltage source U through a resistance 36. The collector of the transistor 35 is connected to the connection point 37 of two resistances 38 and 39 which form a voltage divider substantially in the ratio of 0.7. Two other resistances 40 and 41 constitute a second voltage divider in a ratio of substantially 0.8. The point of connection 42 of these two resistances and the point of connection 37 are both connected to the output of the generator by two diodes, 43 and 44, which are disposed in opposite directions and which constitute a comparator which provides an output voltage equal to the lower of the voltages at 37 and 42.

When the input voltage ($U_e$) is greater than (U), the base of the transistor is negative in relation to its emitter, so that this transistor is conductive and shortcircuits the resistance 38. The value of the voltage at 37 is $U_e$ while that at 42 is 0.8 $U_e$. The output voltage ($U_s$) from the comparator is approximately 0.8 $U_e$.

On the other hand, when the input voltage $U_e$ is reduced, which corresponds to a reduction in the speed in the fastest wheel, to below U, the transistor 35 locks and the voltage at 37 becomes equal to 0.7 $U_e$, while the voltage at 42 is still 0.8 $U_e$. The output voltage $U_s$ supplied by the comparator is then equal to 0.7 $U_e$. The voltage U is determined in such a way that this reduction in the multiplication ratio is produced for a speed of the vehicle of approximately 29 k.p.h. in the case of the vehicle quoted previously by way of example.

The comparator 29 likewise provides a second signal which represents the speed of that one of the front wheels 3a and 3b which is rotating at the slower speed, that is to say that wheel which is undergoing more slip on the ground, and is applied to a comparator 45a, and also a signal which represents the speed of that one of the rear wheels which is travelling at the lower speed and is applied to a comparator 45b.

The comparator 45a is likewise connected to the generator 34 and provides a signal representing the difference between the reference speed and the speed of that one of the front wheels which is rotating less quickly.

A sawtooth voltage generator 46 supplies a voltage of which the instantaneous voltage ($U_d$) varies between $U_1$ and $U_2$. A comparator 47a has an input connected to the sawtooth generator 46, while its other input is connected to the output from the comparator 45a. The output of the comparator 47a is connected to the input of a bistable flip-flop 48a, the output of which is connected to the winding 24 of the valve 5a through an amplifier 49a. The flip-flop 48a supplies a voltage $U_x$ when $U_d$ is less than $U_c$, and provides a zero voltage under contrary circumstances, that is to say when $U_d$ is greater than $U_c$. When the voltage $U_c$ is lower than $U_1$, the voltage at the output of the flip-flop remains at zero. When it is greater than $U_2$ the voltage of the output of the flip-flop constantly has a constant value $U_x$. When the voltage $U_c$ is between $U_1$ and $U_2$, the voltage $U_d$ is less than $U_c$ for a first portion of the cycle (which portion is of increasing length as $U_c$ increases) and is higher than $U_c$ for the remaining portion of the cycle (FIG. 5). During the first portion of the cycle, the difference $U_c-U_d$ is positive and the flip-flop 48a provides a pulse at the voltage $U_x$ (FIG. 6). This pulse ceases when the voltage $U_d$ attains the value $U_c$. Thus it can be seen that the pulses emitted by the flip-flop 48a have a fixed frequency which is that of the sawtooth generator 46, but are of a width which varies as a function of the control voltage $U_c$.

From the foregoing, it is evident that in the absence of slip or when the slip is less than 0.2 (0.3 at low speeds), no current at all passes through the winding 24, the pressure in the cylinders 1a and 1b being of a value which is imparted to them by the dispensing valve 6.

When the amount of slip exceeds 0.2 (or 0.3), a voltage greater than $U_1$ appears at the output of the comparator 45a and the flip-flop 48a provides pulses, the width of which increases as the amount of slip increases. These pulses are integrated in the winding 24 and the valve 5a produces a drop in pressure in the braking circuit, the pressure drop being a function of the amount of slip. However, there is a residual modulation which gives rise to small vibrations of the slide 10 which prevent the slide from sticking in the body 9, which could happen if the slide were to remain immobile in a specific position. Further, the vibrations create an imaginary overlap between the inlet port 13 and the exhaust port 12, increasing the accuracy of control.

Similarly, the comparator 45b connected to the generator 34 supplies a signal representing the difference between the reference speed and the speed of that one of the rear wheels 3c and 3d which is rotating at the slower speed. This signal operates the valve 5b through a comparator 47b, a flip-flop 48b and an amplifier 49b.

In a modified form the diodes 43 and 44 can be replaced by transistors which would amplify the current.

What is claimed is:

1. Apparatus for controlling the braking of front and rear wheels of a vehicle, which comprises:
   a. first means operative to generate a first signal proportional to the difference between the speed of the slowest of said front wheels and a reference speed and a second signal proportional to the difference between the speed of the slowest of said rear wheels and said reference speed;
   b. means for generating a periodic signal;
   c. second means operative to receive said first signal and said periodic signal and generate a first pulsed current control signal;
   d. third means operative to receive second signal and said periodic signal and generate a second pulsed current control signal;
   e. a first electrically-operated valve operative to receive said first pulsed current control signal and automatically proportion braking pressure to said front wheels in response thereto; and
   f. a second electrically-operated valve operative to receive said second pulsed current control signal and automatically proportion braking pressure to said rear wheels in response thereto; and
   g. wherein said second and third means include bistable circuit means.

2. Apparatus according to claim 1, wherein: said reference speed is proportional to the speed of the fastest of said front and rear wheels; said first signal represents the slip of said slowest of said front wheels; said second signal represents the slip of said slowest of said rear wheels; and said first and second pulsed current control signals are proportional to said slowest front wheel slip and said slowest rear slip, respectively.

3. Apparatus according to claim 1, wherein said means for generating a periodic signal is operative to generate a sawtooth signal.

4. Apparatus according to claim 1, wherein said first means is further operative to generate a third signal representing the speed of the fastest of said front and rear wheels.

5. Apparatus according to claim 4, wherein said first means further comprises means operative to receive said third signal and generate a reference signal proportional thereto and representing said reference speed.

6. Apparatus according to claim 5, wherein said first means is further operative to generate a fourth signal representing the speed of the slowest of said front wheels and a fifth signal representing the speed of the slowest of said rear wheels.

7. Apparatus according to claim 6, wherein said first means further comprises means operative to receive said fourth, fifth and reference signals and generate said first and second signals.

8. Apparatus according to claim 5, wherein said first means further comprises memory means operative to receive said third signal and store data of the speed of said fastest of said front and rear wheels and to generate a memory signal the value of which decreases proportional to a speed representing maximum deceleration which can be obtained under optimum grip conditions.

9. Apparatus according to claim 8 wherein said first means further comprises multiplier means operative to receive said memory signal and generate said reference signal therefrom at a fraction of said memory signal.

10. Apparatus according to claim 9, wherein said multiplier means is operative to automatically select one of a plurality of multiplier fractions.

11. Apparatus for controlling the braking of front and rear wheels of a vehicle, which comprises:
    a. first means operative to generate a first signal representing the speed of the fastest of said front and rear wheels, a second signal representing the speed of the slowest of said front wheels, and a third signal representing the speed of the slowest of said rear wheels;

b. second means operative to receive said first signal and generate a reference signal proportional thereto and representing a reference speed;

c. third means operative to receive said second, third, and reference signals and generate first and second pulsed current control signals; and d. first and second electrically-operated valves operative to receive said first and second pulsed current control signals, respectively, and in response thereto automatically proportion braking pressure to said front wheels and rear wheels, respectively; and e. said second means further comprises multiplier means operative to receive said first signal, generate said reference signal therefrom at a fraction of said first signal and automatically select one of a plurality of multiplier fractions according to the value of said first signal.

12. Apparatus according to claim 11 and wherein said first means further comprises memory means operative to receive said first signal and store data of the speed of said fastest of said front and rear wheels and to generate a memory signal the value of which decreases proportional to a speed representing maximum deceleration which can be obtained under optimum grip conditions.

13. Apparatus according to claim 11, wherein said third means comprises means operative to receive said second, third and reference signals and generate a fourth signal proportional to the difference between the speed of the slowest of said front wheels and said reference speed, and a fifth signal proportional to the difference between the speed of the slowest of said rear wheels and said reference speed.

14. Apparatus according to claim 13, wherein said fourth and fifth signals represent the slip of said slowest of said front and said slowest of said rear wheels, respectively, and said first and second pulsed current control signals are proportional thereto, respectively.

15. Apparatus according to claim 13, wherein said third means further comprises means operative to generate a sawtooth signal and means operative to receive said fourth and fifth signals and generate said first and second pulsed current control signals, respectively.

16. Apparatus according to claim 15, wherein said third means further comprises bistable circuit means.

17. Apparatus according to claim 11 and wherein said second means further comprises memory means operative to receive said first signal and store data of the speed of said fastest of said front and rear wheels and to generate a memory signal the value of which decreases proportional to a speed representing maximum deceleration which can be obtained under optimum grip conditions, said multiplier means receiving said memory signal.

18. Apparatus for controlling the braking of front and rear wheels of a vehicle, which comprises:

a. first means operative to generate a first signal representing the speed of the fastest of said front and rear wheels, a second signal representing the speed of the slowest of said front wheels, and a third signal representing the speed of the slowest of said rear wheels;

b. second means operative to receive said first signal and generate a reference signal proportional thereto and representing a reference speed;

c. third means operative to receive said second signal and said reference signal and generate a fourth signal proportional to the difference between said second and said reference signal and representing the slip of said slowest of said front wheels;

d. fourth means operative to receive said third signal and said reference signal and generate a fifth signal proportional to the difference between said third signal and said reference signal and representing the slip of said slowest of said rear wheels;

e. means for generating a sawtooth signal;

f. fifth means including first bistable circuit means operative to receive said fourth signal and said sawtooth signal and generate a first pulsed current control signal proportional to said slowest front wheel slip;

g. sixth means including second bistable circuit means operative to receive said fifth signal and said sawtooth signal and generate a second pulsed current control signal proportional to said slowest rear wheel slip;

h. a first electrically-operated valve operative to receive said first pulsed current control signal and automatically proportion braking pressure to said front wheels in response thereto; and i. a second electrically-operated valve operative to receive said second pulsed current control signal and automatically proportion braking pressure to said rear wheels in response thereto.

19. Apparatus according to claim 18, wherein said second means further comprises multiplier means operative to receive said first signal and generate said reference signal therefrom at a fraction of said first signal.

20. Apparatus according to claim 19 wherein said multiplier means is operative to automatically select one of a plurality of multiplier fractions.

* * * * *